(12) United States Patent
Scott et al.

(10) Patent No.: US 6,671,941 B2
(45) Date of Patent: Jan. 6, 2004

(54) METHOD OF MANUFACTURING AN AIRCRAFT ASSEMBLY TOOL

(75) Inventors: William S Scott, Preston (GB); Simon Cheetham, Chorley (GB); Russell P McKeown, Preston (GB); Kevin J Fowler, Thornton (GB)

(73) Assignee: Bae Systems plc, Farnborough (GB)

( * ) Notice: Subject to any disclaimer, the term of this patent is extended or adjusted under 35 U.S.C. 154(b) by 414 days.

(21) Appl. No.: 09/723,275

(22) Filed: Nov. 29, 2000

(65) Prior Publication Data

US 2001/0025406 A1 Oct. 4, 2001

Related U.S. Application Data

(63) Continuation of application No. PCT/GB00/04374, filed on Nov. 16, 2000.

(30) Foreign Application Priority Data

Nov. 17, 1999 (GB) .............................................. 9927235
Jul. 28, 2000 (GB) .............................................. 0018617

(51) Int. Cl.⁷ .......................... B23Q 17/00; G01M 19/00
(52) U.S. Cl. ............................... 29/407.05; 29/407.09; 29/281.1
(58) Field of Search ..................... 29/407.05, 407.09, 29/407.1, 281.1, 281.3, 281.4; 269/90, 45, 60

(56) References Cited

U.S. PATENT DOCUMENTS

| | | | | |
|---|---|---|---|---|
| 2,332,625 A | | 10/1943 | Ellis et al. | |
| 3,218,056 A | * | 11/1965 | Kaplan et al. | 269/17 |
| 3,603,691 A | * | 9/1971 | Hamilton | 356/152.1 |
| 3,973,859 A | * | 8/1976 | Huber et al. | 408/12 |
| 3,977,147 A | * | 8/1976 | Fletcher et al. | 52/648.1 |
| 4,239,196 A | * | 12/1980 | Hanger | 269/17 |
| 4,781,517 A | * | 11/1988 | Pearce et al. | 414/590 |
| 4,949,944 A | * | 8/1990 | Groff | 269/45 |
| 4,966,323 A | * | 10/1990 | Speller et al. | 29/34 B |
| 4,995,146 A | | 2/1991 | Woods | |
| 5,220,718 A | * | 6/1993 | Speller et al. | 29/431 |
| 5,507,091 A | * | 4/1996 | Bullen | 29/714 |
| 5,653,351 A | * | 8/1997 | Grout et al. | 414/460 |
| 5,778,505 A | * | 7/1998 | Mangus et al. | 29/34 B |
| 5,987,726 A | * | 11/1999 | Akeel | 29/407.08 |
| 6,029,333 A | * | 2/2000 | Sapienza | 29/407.01 |
| 6,419,426 B1 | * | 7/2002 | Chalupa et al. | 408/1 R |

FOREIGN PATENT DOCUMENTS

| | | |
|---|---|---|
| GB | 313163 | 12/1929 |
| GB | 502994 | 3/1939 |
| GB | 522337 | 6/1940 |
| GB | 623684 | 5/1949 |
| GB | 737693 | 9/1955 |
| RU | 2021169 | 10/1994 |
| RU | 2063911 | 7/1996 |
| SU | 1077197 | 7/1996 |

* cited by examiner

Primary Examiner—John C. Hong
Assistant Examiner—Marc Jimenez
(74) Attorney, Agent, or Firm—Nixon & Vanderhye P.C.

(57) ABSTRACT

A method of producing an aircraft assembly tool for supporting an aircraft component comprising calculating a plurality of predetermined positions and corresponding orientations in space at which the aircraft is to be supported, designing a fixture frame at predetermined locations of the frame associated with the predetermined positions, constructing the fixture frame, providing pick-up devices with receiving elements, securing the pick-up devices to the fixture frame, and adjusting each receiving element.

7 Claims, 6 Drawing Sheets

METHOD OF MANUFACTURING AN AIRCRAFT ASSEMBLY TOOL

This is a continuation of PCT application No. PCT/GB00/04373, filed Nov. 16, 2000, the entire content of which is hereby incorporated by reference in this application.

BACKGROUND OF THE INVENTION

1. Field of the Invention

This invention concerns an aircraft assembly tool and a method of manufacturing such a tool.

2. Discussion of the Prior Art

Aircraft assembly tools are designed to support aircraft components while they are being worked on and to locate different components together in the correct relative positions during aircraft assembly. Traditionally, each different assembly process has required at least one dedicated assembly tool, which is produced specifically for a given set of components and which is designed to support the components in a particular manner so that assembly operations can be carried out without interference from the tool. Such assembly tools have had to be manufactured to exacting standards.

A conventional assembly tool comprises a rigid metal jig whose framework is constructed from welded box section steel. A plurality of pick-up devices is mounted on the framework for carrying the aircraft components during the assembly process, and these too are conventionally produced from welded steel parts.

Each assembly tool has to be specifically designed for the component to be supported, and the requirement in the aircraft industry for an aircraft component to be supported with a very high degree of precision means that every stage of construction of the conventional jig has to be carried out to very exacting levels of accuracy. This makes the production of such jigs time-consuming and costly, and they cannot easily be reconfigured for supporting different components, or repaired/adjusted so as to accommodate wear and tear.

As is evident, such an arrangement has significant drawbacks, not the least of which are the high tooling costs resulting from the requirement for a dedicated jig for each aircraft assembly process together with the levels of accuracy needed for producing each jig. Minor modifications in aircraft component design usually mean that a completely new pick-up device or arrangement thereof must be produced, causing further tooling costs and assembly delays. In addition, wear and tear or damage to a jig generally results in the need for a replacement since repairs and adjustments cannot readily be made whilst maintaining the necessary level of precision and integrity for the framework and the pick-up devices.

In spite of these drawbacks, the construction of such aircraft assembly tooling has remained essentially unchanged for almost fifty years.

There is thus a significant need for an aircraft assembly tooling system that is more flexible in design and more economic to produce and use.

SUMMARY OF THE INVENTION

The present invention seeks to provide an assembly tool, and a method of producing such a tool, which is more versatile than conventional arrangements and in which the need for precision is confined to some parts only of the tool and its production.

According to one aspect of the invention an aircraft assembly tool for supporting an aircraft component comprising:
  a) a fixture frame configured to provide support at predetermined locations of the frame associated with a plurality of predetermined positions and orientations in space at which the component is to be supported;
  b) the fixture frame comprising elongate members having predetermined lengths connected together by means of releasable fastening means;
  c) a plurality of pick-up devices, each having a receiving element for carrying the component and comprising further elongate members having predetermined lengths connected together by means of clamping elements adapted selectively to allow at least three degrees of freedom of movement of each receiving element along at least two orthogonal axes and around at least one axis coplanar with the orthogonal axes;
  d) the pick-up devices being mounted to the fixture frame at the predetermined locations; and
  e) each receiving element being aligned about/around the orthogonal axes with a respective predetermined position and orientation.

The fixture frame may be constructed from lengths of extruded aluminium section with the fastening means securing the lengths together. For example, the extruded aluminium section may be formed with longitudinal channels having lips along their edges, and the fastening means may comprise threaded connecting elements receivable in a channel of one section and threaded receiving means provided by or receivable within a channel of another section.

For reasons of constructional accuracy and for strength and rigidity of the fixture frame, it is preferable that the elongate members are rectangular in cross-section, or have at least one substantially flat, planar surface to which the pick-up devices can be clamped, and moved along if necessary—to adapt to a different component, for example. It is also important that these planar surfaces of the elongate members are so configured as to remain undistorted when a pick-up device is mounted thereon, particularly when the device is under load from the weight of the aircraft component. This preferred embodiment has the additional advantage that it facilitates rapid movement and/or re-alignment/re-positioning of the pick-up devices. In this embodiment, because in use the pick-up device moves along a planar face, the range of movement necessary to accommodate wear and tear or to adapt to a different component may easily and accurately be modelled in the computer as a movement in a single dimension (along the axes of the elongate member, but without any rotation thereabouts) while taking account of the six degrees of freedom of adjustment possible for the receiving element. Where a desired relocation of the pick-up is not feasible, due e.g. to the position of the elongate member and/or the limited range of adjustment of the receiving element, the required re-alignment may be accommodated by removing the pick-up device abd mounting it instead on one the other planar surfaces of the elongate member. Thus the provision of a planar face to the elongate members ensures that simple movement of the pick-up device relative to the elongate member is limited to movement along a single axis, and without any relative rotation: this is a substantial and advantageous difference over the prior art constructions.

The pick-up devices are preferably of universal construction.

According to another aspect of the invention there is provided a universal pick-up device for mounting on a fixture frame to provide an aircraft assembly tool for supporting an aircraft component during the assembly process, the pick-up device comprising a mounting element for mounting the device on the fixture frame, a receiving element for carrying the aircraft component, and a plurality of elongate members having predetermined lengths connected together by means of clamping elements so as to allow at least three degrees of movement of the receiving element along at least two orthogonal axes and around at least one axis coplanar with the orthogonal axes.

In the preferred embodiment of the invention described below, the combination of elongate members and clamping elements are arranged to allow six degrees of freedom of movement of the receiving element along and around three orthogonal axes.

The pick-up devices may also be formed from aluminium.

The aircraft assembly tool and pick-up device according to the present invention offer a number of significant advantages.

In particular, the invention provides a flexible assembly tooling system that is fully adjustable and re-usable. Adjustments and alterations to the assembly tooling can readily be effected, for example in order to accommodate modifications in the design of the aircraft components. Maintenance simply involves replacement of individual frame members and/or pick-up devices in the event of excessive wear, or repositioning of frame members and/or pick-up devices if relative movement has occurred over time. Furthermore, existing assembly tools can be altered to suit different aircraft components once a particular assembly operation is complete.

Another aspect of the present invention is the method of producing the aircraft assembly tool.

According to this aspect of the invention, a method of producing an aircraft assembly tool for supporting an aircraft component comprising:

a) determining a plurality of predetermined positions and orientations in space at which the component should be supported;

b) designing a fixture frame configured to provide support at predetermined locations of the frame associated with said predetermined positions;

c) constructing the fixture frame by selecting elongate members having predetermined lengths and connecting the elongate members together by means of releasable fastening means;

d) constructing a plurality of pick-up devices, each having a receiving element for carrying the component, by selecting further elongate members having predetermined lengths and connecting the further elongate members together by means of clamping elements adapted selectively to allow at least three degrees of freedom of movement of each receiving element along at least two orthogonal axes and around at least one axis coplanar with the orthogonal axes;

e) mounting the pick-up devices to the fixture frame at the predetermined locations; and f) moving each receiving element along/around the orthogonal axes to align the receiving element with a respective predetermined position and orientation.

Preferably, step f) comprises setting a receiving element approximately in its predetermined position and orientation, and iterating the steps of measuring the actual position and orientation of the receiving element and moving it towards the predetermined position and orientation until it achieves the predetermined position and orientation.

Preferably, the predetermined positions and orientations for the receiving elements of the pick-up devices are determined from computer aided design data for each aircraft component.

Preferably, the actual position and orientation of each receiving element is measured by a laser tracking device.

The present method and assembly tool, whilst specifically designed for use in the aircraft industry, may also advantageously have application in other fields, for example in the automotive industry.

BRIEF DESCRIPTION OF THE DRAWINGS

The invention is described further, by way of example, with reference to the accompanying drawings in which.

DETAILED DISCUSSION OF EMBODIMENTS

Figure 1:
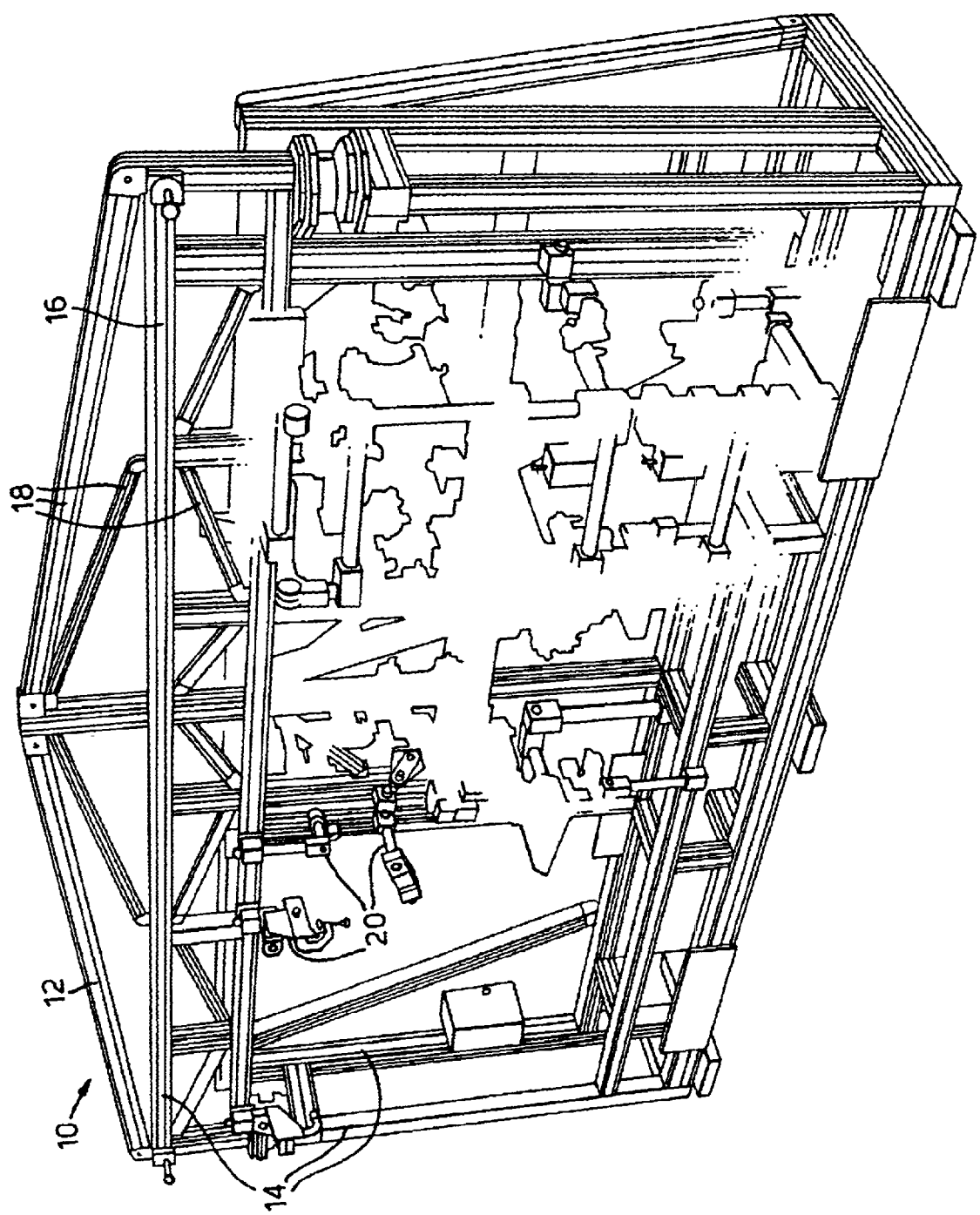
FIG. 1 is a perspective view of one embodiment of aircraft assembly tool according to the present invention.

Referring initially to FIG. 1, this shows an aircraft assembly tool 10 according to the present invention. The assembly tool 10 comprises a fixture frame 12, constructed from a plurality of elongate members 14 of square and rectangular cross-section connected to one another to form a substantially rectangular framework 16. The majority of the elongate members 14 are connected to one another at right angles to form the framework 16 but some of them form diagonal members 18 serving as reinforcing struts for enhancing the rigidity of the framework 16. The fixture frame 12 serves as a support structure for an aircraft component during assembly.

A plurality of pick-up devices 20 mounted on the fixture frame 12 serve to hold the component during the assembly process, and are situated at predetermined locations in relation to the fixture frame 12 for engaging and carrying the component at preselected support positions of the component.

The assembly tool 10 shown in FIG. 1 is specifically designed for the assembly of a particular aircraft component, or a small range of components, in this instance being for the assembly of an aircraft fuselage: the precise design of the fixture frame 12 and the location and orientation of the pick-up devices 20 would be different for the assembly of another part of an aircraft. The accuracy of construction of the fixture frame 12 and the accuracy of location of the pick-up devices 20 in relation to the fixture frame 12 are relatively unimportant. What matters is that the positions at which the pick-up devices 20 engage the aircraft component, and the orientation of the pickup devices at these positions, are highly accurately determined, as described below.

The elongate members 14 are formed from extruded aluminium section, which is cut to predetermined lengths suited to the specific fixture frame 12 required. FIGS. 2, 3, 4 and 6 show different profiles for the extruded section, which is illustrated as being square or rectangular in each case. Longitudinally extending channels 22 are formed along the four longitudinal surfaces 24 of the member 14, and are each flanked on both sides by lips 26.

Figure 2:
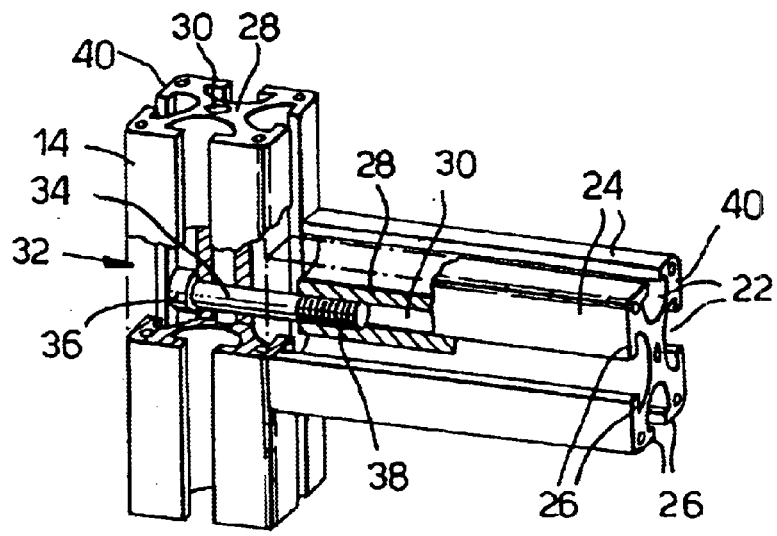
FIG. 2 is a fragmentary view, partly in section, showing a detail from FIG. 1.
Figure 3:
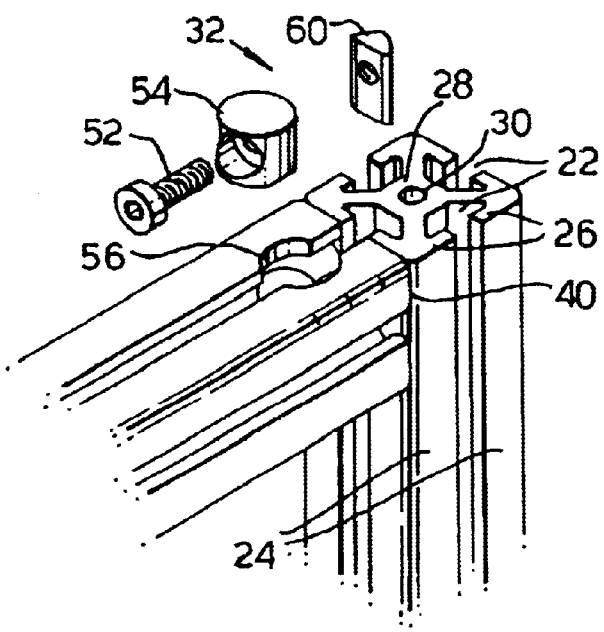
FIG. 3 is another fragmentary view showing a modification of the arrangement of FIG. 2.
Figure 4:
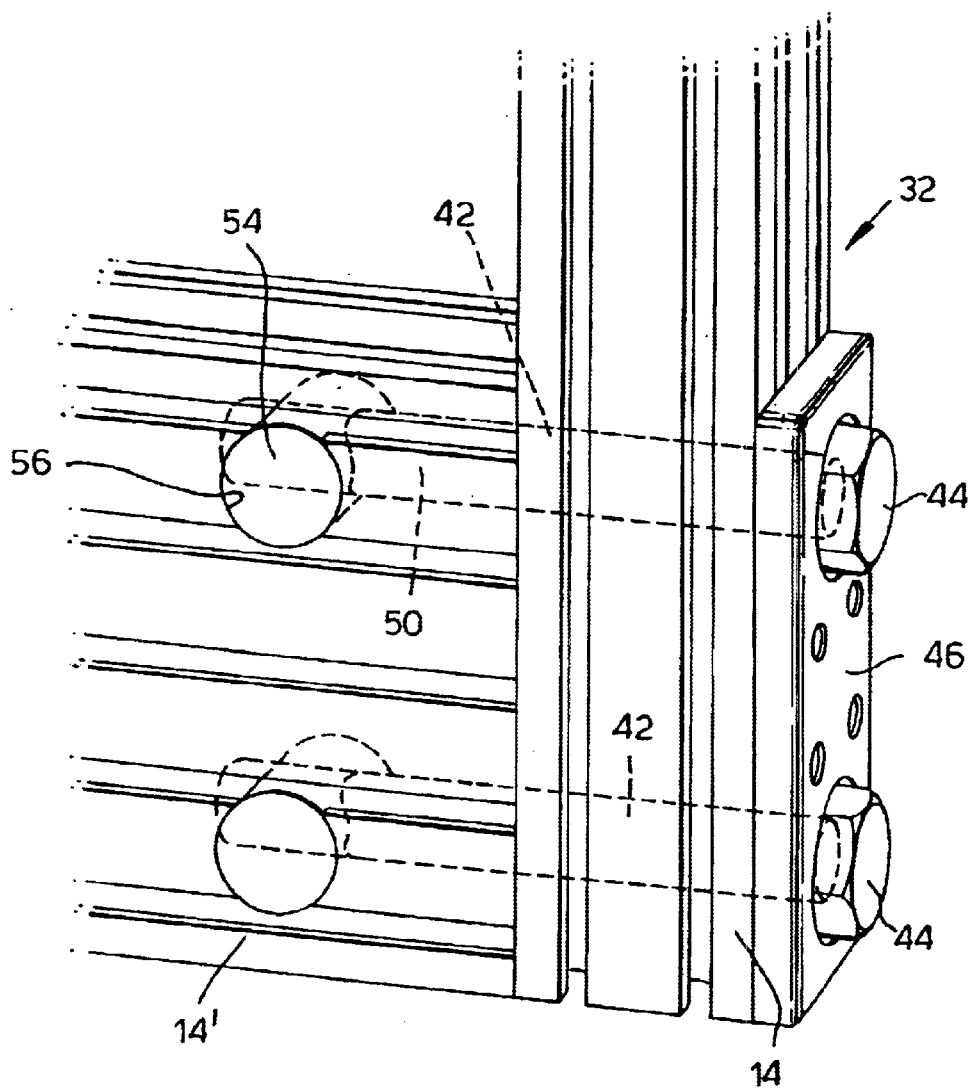
FIG. 4 is a fragmentary view showing a further modification of the arrangements of FIGS. 2 and 3.
Figure 5:
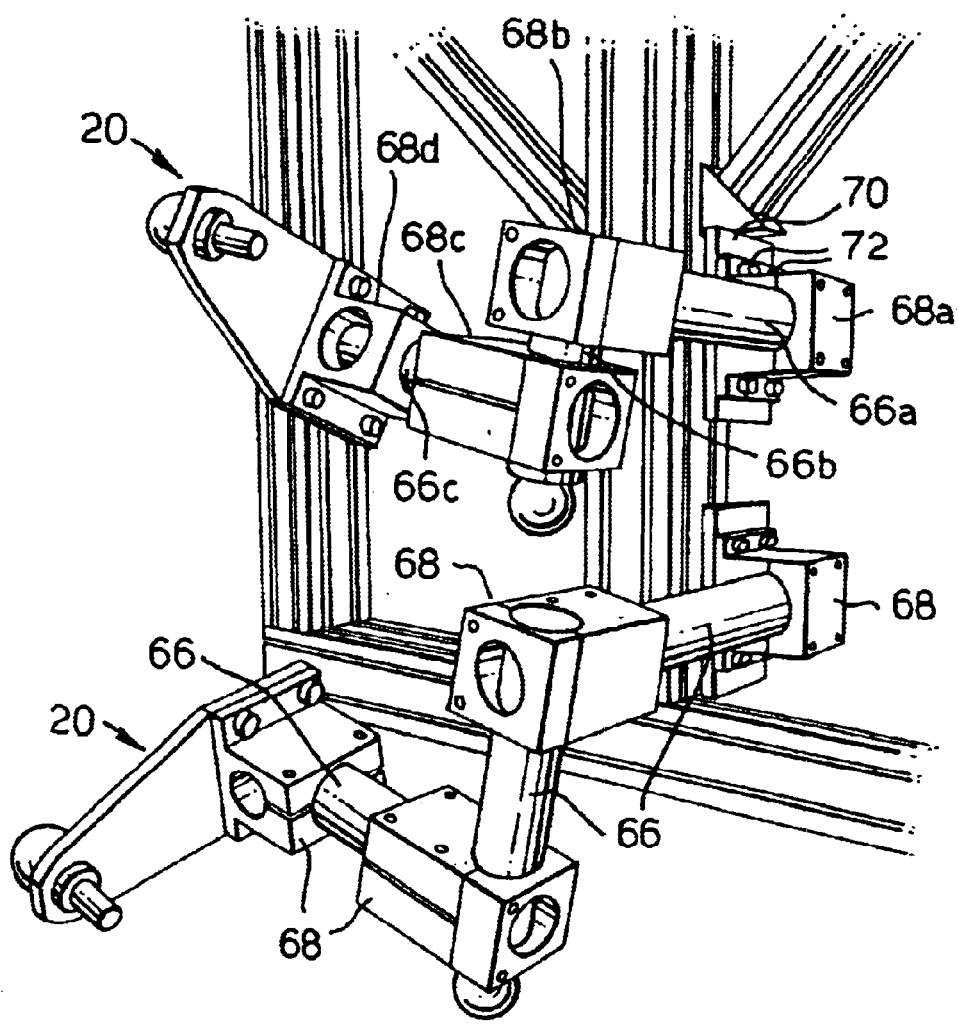
FIG. 5 is a perspective view of a portion of the assembly tool of FIG. 1 showing two pick-up devices mounted on a fixture frame of the tool.

The sections illustrated in FIGS. 2, 3 and 4 all have a substantially solid central axial portion 28 formed with a central bore 30, while that shown in FIG. 5 has an open central axial portion 28' and respective bores 30' formed in the metal flanking the open portion 28' and underlying each channel 22.

The inter-connection of two elongate members 14 at right angles is readily achieved by fastening means 32. As shown in FIG. 2, these fastening means 32 may, for example, comprise a threaded connecting element 34 inserted perpendicularly through the central portion 28 of one member 14. The connecting element 34 has a locating head 36 which sits within a respective one of the channels 22 of the member 14, and a threaded shaft 38 which then projects at right angles from the member 14.

A second elongate member 14 is fitted at right angles to the first so that its end face 40 abuts an adjacent surface 24 of the first elongate member 14. The projecting shaft 38 of the threaded connecting element 34 can thus be tapped into the central bore 30 of the second elongate member 14. A secure a lasting connection may thus be provided.

As shown in FIG. 3, the fastening means 32 may alternatively comprise a threaded connecting element 52 receivable within one channel 22 of a first elongate member 14, and a locating collar 54 arranged to be fitted within a receiving well 56 formed in the associated surface 24 near the end face 40 of th is elongate member 14.

The locating collar 54 has bore 58, which is directed towards a facing channel 22 of a second perpendicular elongate member 14 between the two overhanging lips 26. An internally threaded receiving element 60 is received within this channel 22 and is firmly held within the channel by means of the overhanging lips 26. By threading the connecting element 52 tightly into the receiving element 60, the two elongate members 14 can be securely fastened to one another at right angles.

It will be appreciated that in the present instance a second such connecting element 52 will also be provided in the same manner on the opposite side of the first elongate member 14. This second connecting element 52 will then engage a second receiving element 60 in the same channel 22 of the second elongate member 14 in order to ensure a secure connection between the two members 14.

FIGS. 2 and 3 illustrate a simple square extruded section for the elongate members 14 for the sake of clarity. In practice, the elongate members 14 may have more complex sections and may require multiple fastening means 32 employing groups of fasteners. A cross section which is substantially square or rectangular is advantageous in terms of strength and rigidity.

A further form of fastening means 32 shown in FIG. 4 may be employed for a high strength joint. In this instance, the fastening means 32 may comprise a pair of threaded bolts 42, each having a respective head 44 engaged with a structural plate 46 and each extending right through a transverse clearance hole 48 in one elongate member 14 of square section. The stem 50 of each bolt 42 engages a threaded bore within a respective locating collar 54, which is received within a receiving well 56 of another elongate member 14, this time of rectangular section, as shown in FIG. 3. The load is then distributed across the first elongate member 14 by means of the plate 46.

All of the perpendicular connections within the fixture frame 12 are effected by fastening means such as those shown in and described in relation to FIGS. 2, 3 and 4.

In addition, as previously mentioned, if the rigidity of the framework 16 needs to be further enhanced, a number of diagonal reinforcing struts 18 may be provided which are similarly formed from extruded aluminium section. Such struts are connected in place by means of pairs of hinge elements 62, 64 mounted respectively between the ends of the diagonal reinforcing struts 18 and adjacent portions of the framework 16 as shown in FIGS. 1 and 7, for example.

Figure 6:
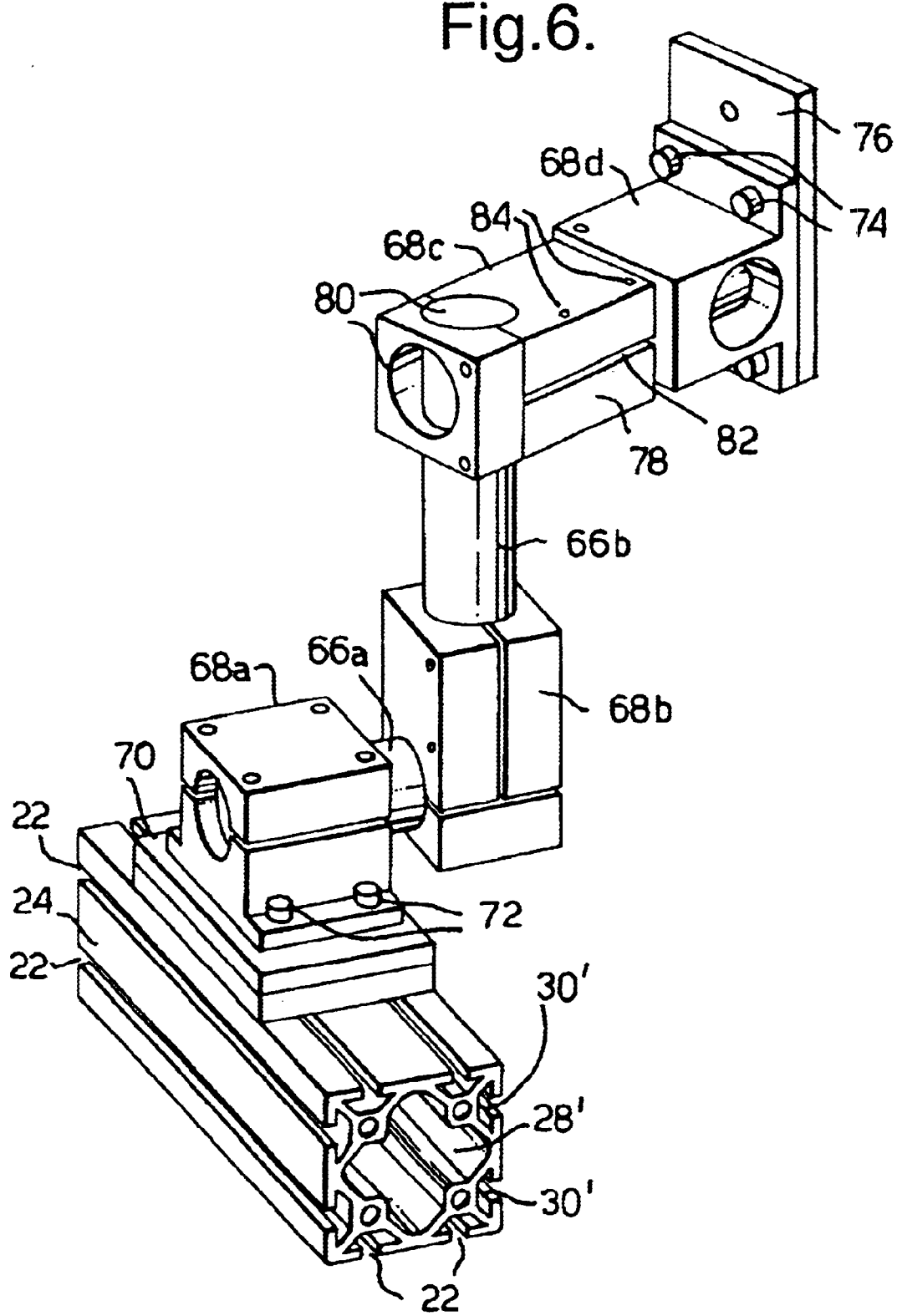
FIG. 6 is another perspective view showing the mounting of a respective pick-up device on the fixture frame.
Figure 7:
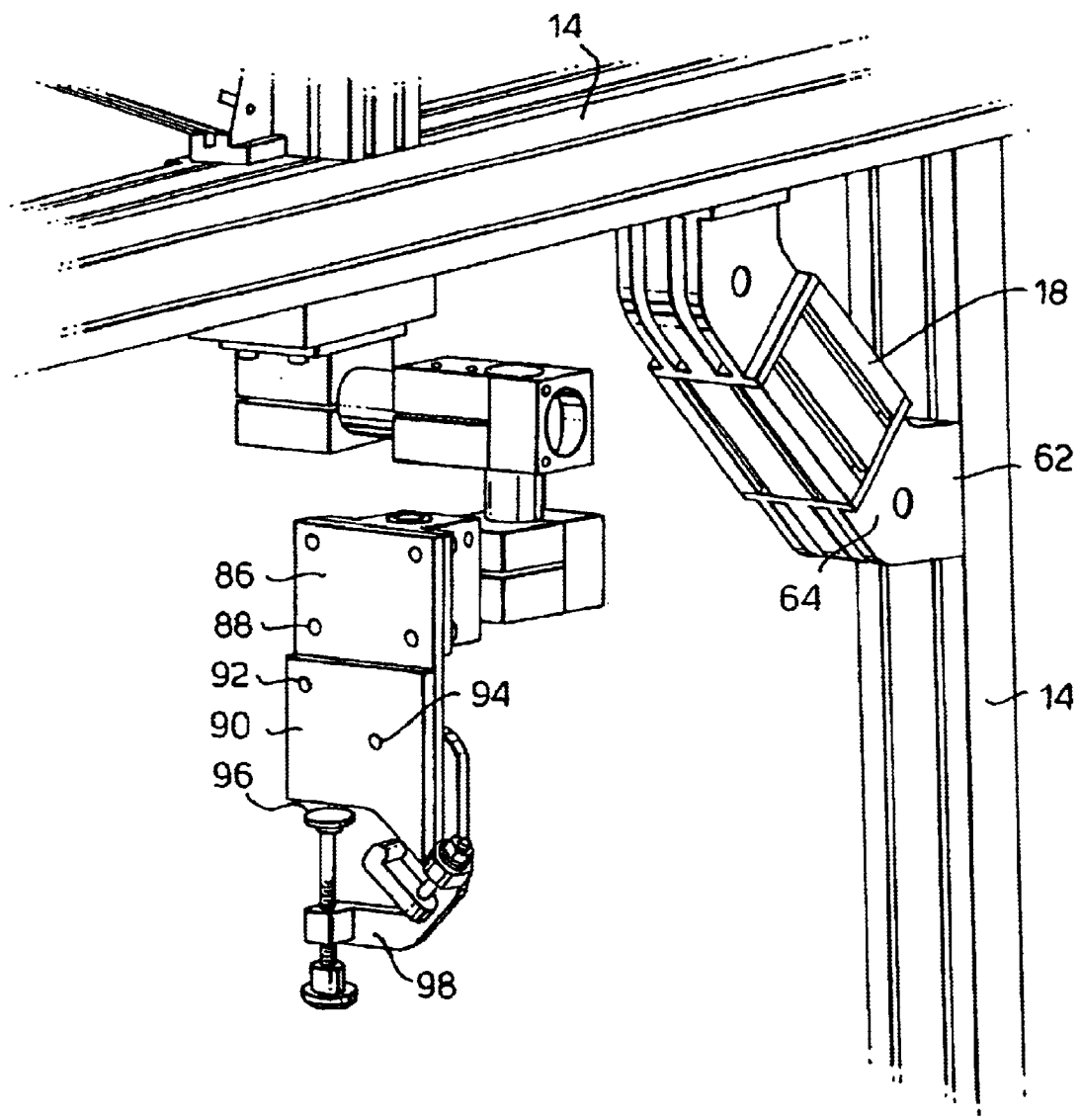
FIG. 7 is a perspective view of another portion of the assembly tool showing a further pick-up device mounted on the fixture frame.

Turning now to FIGS. 5 to 7, these show in greater detail respective ones of the pick-up devices 20. As shown, each pick-up device 20 comprises an arrangement of tubes 66 and clamping elements 68 connected together to permit movement with at least three, and preferably six, degrees of freedom.

More particularly, each pick-up device 20 comprises a mounting element 70 for mounting the pick-up device 20 on the fixture frame 12, for example by means of bolts 72 which engage with nuts (not shown) in the channels 22 of the associated elongate members 14. The mounting element 70 has a substantially flat planar surface arranged to co-operate with the adjacent flat planar surface of the member 14, so that the pickup device 20 can readily be moved along the surface of the member 14, for purposes of location or adjustment, prior to being bolted securely in place.

A first clamping element 68*a* is fixed to the mounting element 70 using the bolts 72. Extending from the first clamping element 68*a* is a first tube 66*a* terminating in a second clamping element 68*b* as illustrated. A second tube 66*b*, arranged perpendicular to the first tube 66*a*, extends between the clamping element 68*b* and a further clamping element 68*c*. Likewise, a third tube 66*c* is arranged at right angles to the second tube 66*b* and extends between the clamping element 68*c* and a further clamping element 68*d*. Finally, the clamping element 68*d* is connected by means of bolts 74 to a receiving element 76, which serves in use for engaging and holding the aircraft component.

The tubes 66 and the clamping elements 68 are also formed from aluminium. More particularly, each clamping element 68 comprises a block 78 of aluminium provided with cylindrical openings 80 for rotatably and slidably receiving the tubes 66. A respective slot 82 is formed in the block 78 along one side of each cylindrical opening 80 to provide a gap which is closable by means of further bolts 84 to ensure that the clamping element 68 firmly engages and locks onto a respective tube 66 in the required position.

It will be appreciated that by means of this arrangement the tubes 66 can be rotated relative to one another about, and/or displaced relative to one another along, three mutually perpendicular axes.

Consequently, adjustment of the pick-up devices 20, both in terms of locating the pick-up devices 20 relative to the fixture frame 12 and in terms of positioning and orienting the receiving elements 76 in space, can readily be effected to accommodate: a) minor variations in the positions of the pick-up devices 20; and b) movements of the fixture frame 12 that occur over time due to factors such as wear and tear, and thermal expansion and contraction. Likewise, the pick-up devices 20 can easily be adapted to accommodate minor design modifications in the aircraft component itself, simply by altering the location of the existing pick-up devices 20 relative to the fixture frame 12, and the position and/or the orientation of the receiving elements 76, or alternatively by adding additional pick-up devices 20. Furthermore, it is entirely possible once a particular assembly process is complete to disassemble the assembly tool 10 and reassemble it in a totally different configuration for the assembly of a different aircraft component.

The method of producing the illustrated assembly tool 10 is as follows:

Firstly, the design requirements for the specific assembly tool 10, including both the fixture frame 12 and the pick-up devices 20, are determined from data taken from a known computer aided design system for the particular aircraft component. From such data, a plurality of points at which the component should be supported, and the required direction of the support in each case, are worked out. The construction of the fixture frame 12 and the number and location of the pick-up devices 20, together with the positioning and the orientation of the receiving elements 76, are then calculated.

Next, the parts for the fixture frame 12 are produced by cutting lengths of extruded aluminium section to the required dimensions to provide the elongate members 14. Such elongate members 14 are connected together by fastening means 32 as described previously, and subsequently any additional elongate members 14 forming the reinforcing struts 18 are connected into the framework 16 as previously described.

Having thus constructed the fixture frame 12, the pick-up devices 20 are selected and mounted on the fixture frame 12 at the predetermined locations.

Although it is possible to produce a plurality of different pick-up devices 20 each including a number of tubes 66 cut to different lengths according to the required purpose, it is nevertheless preferred according to the present invention to employ a single universal design of pick-up device 20 and to have a supply of these already in stock at any one time. In this instance, each pick-up device 20 would have been preformed from predetermined lengths of tubing joined by similar clamping elements.

Accordingly, the next step of the manufacturing process simply involves selecting the required number of pick-up devices 20 and mounting them on the fixture frame 12 in locations predetermined from the computer aided design data.

Thus far, the manufacturing process can be carried out to a level of accuracy allowing for standard tolerances. However, the following stages of the manufacturing process require a much higher degree of accuracy within very fine tolerances indeed:

Once mounted on the fixture frame 12, the pick-up devices 20 then have to be set into the required orientation in order to hold the aircraft component at predetermined precise points of its structure and in a predetermined precise directions. In order to set each pick-up device 20 appropriately and with the necessary precision, a laser tracker or other measuring device is employed.

More particularly, the laser tracker comprises a computer controlled laser measuring apparatus into which the data relating to the predetermined position and orientation of the receiving element 76 of each pick-up device 20 has already been programmed. The pick-up device 20 is first mounted roughly in the required position and orientation on the fixture frame 12, and the laser tracker is then used to measure the initial position and orientation of the receiving element 76 and to compare this position to the required position. The results of the comparison yield adjustment data following which the pick-up device 20 is correspondingly adjusted to bring the receiving element 76 to a new position and orientation. The laser tracker takes another measurement of the current state and again compares it to the predetermined requirements. This yields further adjustment data and a further adjustment is made accordingly until the predetermined position and orientation is achieved within the required fine tolerances. Hence, the setting of the receiving element 76 of the pick-up device 20 involves repeated steps of measurement of a current position and orientation, comparison of a current position and orientation with the predetermined position and orientation, and adjustment to reduce the error between the two.

Referring to FIG. 7, the process of setting each pick-up device 20 in two stages will be described in greater detail.

In stage 1, a face 86 of the receiving element 76 and a hole 88 within that face are adjusted to predetermined positions and orientations.

Firstly, the face 86 of the receiving element 76 is set square to a required plane in space by successive rotations of the tubes 66a, 66b and 66c relative to each of the X, Y and Z axes in turn. Following each rotation, measurements are taken across the face 86 by the laser tracker and a comparison is made with the predetermined orientation.

Secondly, the hole 88 in the face 86 of the receiving element is moved into the required position by effecting successive translations along the X, Y and Z axes in turn by effecting displacements of the clamping elements 68b, 68c and 68d along the tubes 66a, 66b and 66c respectively. Again, measurements are taken by the laser tracker after each successive translation and a comparison is made with the predetermined position.

In stage 2, a profile board 90 is mounted in a predetermined position and orientation relative to the receiving element 76.

Firstly, the profile board 90 is moved to a predetermined position relative to the face 86 of the receiving element 76 with the aid of the laser tracker. The profile board 98 is then rotatably attached to the receiving element 76 by inserting a pin through a hole 92 in the profile board 90 and a corresponding hole (not shown) in the face 86.

Next, a second hole 94 in the profile board 90 is positioned with the aid of the laser tracker by repeated rotational adjustment of the board 90, followed on each occasion by measurement of the current position of the hole 94 and comparison with the predetermined position. This brings a locating edge 96 of the profile board 90 into a predetermined position, at which point the profile board is fixed to the receiving element 76.

Finally, gripping fingers 98 are attached to the profile board 90 and hence the receiving element 76.

In the present instance, the adjustments of the parts of the pick-up device 20 during the two stages of the setting process are carried out manually. It is equally possible for these adjustments to be made automatically under the control of the laser tracker.

Other modifications are also possible in the described method and assembly tool:

For example, the described embodiment envisages that the pick-up device be so arranged as to provide the receiving element with six degrees of freedom of movement, along and about three orthogonal axes. However, provision of only three degrees of freedom of movement, namely along at least two orthogonal axes and around at least one of those axes, would in at least some circumstances be sufficient.

The described method of producing an aircraft assembly tool allows for a high degree of accuracy in the production of the tool within narrow tolerances, and also for ease of adjustment when necessary.

Both the assembly tool itself and the method of manufacturing it are versatile, and result in an economic and flexible tooling system.

What is claimed is:

1. A method of producing an aircraft assembly tool for supporting an aircraft component comprising:
    a) calculating a plurality of predetermined positions and corresponding orientations in space at which the aircraft component is to be supported;
    b) designing a fixture frame configured to provide support for the aircraft component at predetermined locations of the frame associated with said predetermined positions;
    c) constructing the fixture frame by selecting elongate members having predetermined lengths and connecting the elongate members together by means of releasable fastening means;
    d) providing a plurality of pick-up devices, each having a receiving element for carrying the component, by selecting further elongate members having predetermined lengths and connecting the further elongate members together and to the receiving element by means of clamping elements adapted selectively to allow at least three degrees of freedom of movement of each receiving element along at least two orthogonal axes and around at least one axis coplanar with the orthogonal axes;
    e) securing the pick-up devices to the fixture frame at the predetermined locations; and
    f) adjusting each receiving element along/around the orthogonal axes to align the receiving element with a respective predetermined position and orientation.

2. A method according to claim 1 in which the step f) comprises setting a respective receiving element approximately in its predetermined position and orientation, and iterating the steps of measuring the actual position and orientation of the respective receiving element and moving it towards the predetermined position and orientation until it achieves the predetermined position and orientation.

3. A method according to claim 2, in which the actual position and orientation of each receiving element are measured and compared to the predetermined position and orientation as determined from computer aided design data for an associated component.

4. A method according to claim 1 in which the clamping elements are adapted selectively to allow six degrees of freedom of movement, along and around three orthogonal axes, step f) comprising moving each receiving element along and around three orthogonal axes.

5. A method according to claim 1, in which the predetermined positions and orientations are determined from computer aided design data for an associated component.

6. A method according to claim 1 in which the actual position and orientation of each receiving element is measured by means of a laser tracking device.

7. A method for producing an aircraft assembly tool for supporting an aircraft component, said method comprising:
    calculating a plurality of predetermined positions and corresponding orientations in space at which said component is to be supported;
    designing a fixture frame for supporting said component at predetermined locations of the frame associated with said predetermined positions;
    constructing the fixture frame with elongate members interconnected with releasable fasteners;
    providing a plurality of pick-up devices corresponding to said plurality of predetermined locations, each pickup device comprising:
        a receiving element for supporting said component at a respective predetermined position and corresponding orientation;
        a plurality of connecting elements; and
        a plurality of clamping elements for interconnecting said receiving element through said connecting elements to said fixture frame, said plurality of pick-up devices permitting three degrees of freedom of adjustment between said receiving element and said fixture frame; and
    mounting said pick-up devices on said fixture frame at said predetermined locations.

* * * * *